US008474497B2

(12) United States Patent
Otsuji

(10) Patent No.: US 8,474,497 B2
(45) Date of Patent: Jul. 2, 2013

(54) PNEUMATIC TIRE WITH TREAD HAVING HEART-SHAPED BLOCKS

(75) Inventor: Hideki Otsuji, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 428 days.

(21) Appl. No.: 12/745,184

(22) PCT Filed: Nov. 25, 2008

(86) PCT No.: PCT/JP2008/071329
§ 371 (c)(1),
(2), (4) Date: May 27, 2010

(87) PCT Pub. No.: WO2009/069585
PCT Pub. Date: Jun. 4, 2009

(65) Prior Publication Data
US 2010/0300588 A1    Dec. 2, 2010

(30) Foreign Application Priority Data

Nov. 28, 2007 (JP) .................. 2007-307703
Nov. 28, 2007 (JP) .................. 2007-307704
Nov. 29, 2007 (JP) .................. 2007-309157

(51) Int. Cl.
*B60C 11/11* (2006.01)
(52) U.S. Cl.
USPC ................ 152/209.18; 152/209.28
(58) Field of Classification Search
USPC .................. 152/209.1, 209.18, 209.28
See application file for complete search history.

(56) References Cited

U.S. PATENT DOCUMENTS

| 4,633,926 | A | * | 1/1987 | Tamura ............... 152/209.1 |
| 4,982,775 | A | | 1/1991 | Matsumoto |
| 5,297,604 | A | * | 3/1994 | Lurois ............... 152/209.23 |
| 5,373,882 | A | * | 12/1994 | Nakagawa ........... 152/209.28 |
| 5,435,366 | A | | 7/1995 | Voigt et al. |
| 5,759,313 | A | * | 6/1998 | Shirai et al. ........... 152/209.18 |
| 2004/0134580 | A1 | | 7/2004 | Colombo et al. |
| 2006/0060278 | A1 | | 3/2006 | Noguchi et al. |

FOREIGN PATENT DOCUMENTS

| DE | 102005058363 | * | 6/2007 |
| JP | 57-167802 A | | 10/1982 |
| JP | 60-5903 U | | 1/1985 |
| JP | 63-34205 A | | 2/1988 |

(Continued)

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

To improve the steering stability on a wet road surface.
A land ratio of a shoulder portion Sh of a tread portion 2 is 57 to 72%, and a land ratio of a center portion Ce is 40 to 55%. In the center portion Ce, one row block made up of center blocks 6 is formed. Each of the center blocks 6 has its width gradually reduced from a position establishing an axial maximum width BW toward both a leading end and a trailing end relative to the tire rotating direction, each of the center blocks being provided with, at the leading end thereof, a tip portion 6*a* that sharpens toward the leading end, and being provided with, at the trailing end thereof, a concave portion 6*b* that smoothly concaves toward the leading end. In each of the center blocks 6, a ratio (BL/BW) between the axial maximum width BW and a maximum length BL in the circumferential direction is 1.00 to 1.20.

2 Claims, 8 Drawing Sheets

FOREIGN PATENT DOCUMENTS

| | | | |
|---|---|---|---|
| JP | 1-254405 A | | 10/1989 |
| JP | 2-182504 | * | 7/1990 |
| JP | 3-65409 A | | 3/1991 |
| JP | 6-278412 A | | 10/1994 |
| JP | 8-99506 A | | 4/1996 |
| JP | 11-91316 A | | 4/1999 |
| JP | 2001-55014 A | | 2/2001 |
| JP | 2004-520998 A | | 7/2004 |
| JP | 2004-338508 A | | 12/2004 |
| JP | 2005-153654 A | | 6/2005 |
| JP | 2006-82735 A | | 3/2006 |
| JP | 4137178 B1 | | 8/2008 |

* cited by examiner

PNEUMATIC TIRE WITH TREAD HAVING HEART-SHAPED BLOCKS

TECHNICAL FIELD

The present invention relates to a pneumatic tire that possesses improved steering stability on a wet road surface.

BACKGROUND ART

To obtain the enhanced turning performance of tires for use with four-wheel vehicles, an increased rigidity of the tread pattern is effective. Attempts have been made at this purpose, specifically, such as hardening the rubber of the tread portion, reducing the depth of grooves of the tread portion and the like. One related technique is as follows.
[Patent Document 1] Japanese Patent Application Publication No. 2006-82735

DISCLOSURE OF THE INVENTION

Technical Problems to be Solved

However, when the rubber of the tread portion is hardened, it is difficult to obtain adequate grip when running on a wet road surface where the friction coefficient is small. Similarly, when the groove depth of the tread portion is reduced, adequate drainage performance cannot be achieved. In either case, there is a disadvantage of a significant reduction in steering stability when running on a wet road surface.

A primary object of the present invention is to provide a pneumatic tire that possesses improved steering stability on a wet road surface.

Means to Solve the Problems

According to a first aspect of the present invention, a pneumatic tire includes a tread portion having a tread pattern being formed by repetitive arrangement of substantially identically patterned pattern pitches in the circumferential direction of the tire. The tread portion has a center portion making up 50% of a tread ground-contact width whose center is a tire equator, and shoulder portions respectively situated on opposite sides of the center portion. In each of the shoulder portions, shoulder main grooves extending inwardly from an outside relative to a tread ground-contact edge in the axial direction of the tire are arranged at certain intervals in the circumferential direction of the tire, whereby a shoulder land portion is established between the shoulder main grooves, a land ratio in each of the shoulder portion between the tread ground-contact edge and an outer edge of the center portion being 57 to 72%. In the center portion, between the shoulder land portions being arranged on opposite sides in the axial direction of the tire, at least one center block row having center blocks arranged in the circumferential direction at certain intervals is provided, a land ratio of the center portion being 40 to 55%. The center block row is formed one in number. Each of the center blocks has its width gradually reduced from a position establishing a maximum width BW in the axial direction of the tire toward both a leading end and a trailing end relative to the tire rotating direction, each of the center blocks being provided, at the leading end thereof, with a tip portion that sharpens toward the leading end, and being provided, at the trailing end thereof, with a concave portion that smoothly concaves toward the leading end, so as to be substantially heart-shaped in its entirety, and in each of the center blocks, a ratio (BL/BW) between the axial maximum width BW and a maximum length BL in the circumferential direction is 1.00 to 1.20.

According to a second aspect of the present invention, a pneumatic tire includes a tread portion having a tread pattern being formed by repetitive arrangement of substantially identically patterned pattern pitches in the circumferential direction of the tire. The tread portion has a center portion making up 50% of a tread ground-contact width whose center is a tire equator, and shoulder portions respectively situated on opposite sides of the center portion. In each of the shoulder portions, shoulder main grooves extending inwardly from an outside relative to a tread ground-contact edge in the axial direction of the tire are arranged at certain intervals in the circumferential direction of the tire, whereby a shoulder land portion is established between the shoulder main grooves, a land ratio in each of the shoulder portion between the tread ground-contact edge and an outer edge of the center portion being 57 to 72%. In the center portion, between the shoulder land portions being arranged on opposite sides in the axial direction of the tire, at least one center block row having center blocks arranged in the circumferential direction at certain intervals is provided, a land ratio of the center portion being 40 to 55%. When the pattern pitches are each constituted of one of the shoulder main grooves and one of the shoulder land portions being adjacent to the one shoulder main groove, the pattern pitches each have a high land ratio region in which a sum of length in the axial direction of the tire of portions contacting the road surface on a tire axial line passing through the pattern pitch is 78 to 93% of the tread ground-contact width. The high land ratio region is continuous in the circumferential direction of the tire by 20 to 35% of a length in the circumferential direction of the tire of each of the pattern pitches.

According to a third aspect of the present invention, a pneumatic tire includes a tread portion having a tread pattern being formed by repetitive arrangement of substantially identically patterned pattern pitches in the circumferential direction of the tire. The tread portion has a center portion making up 50% of a tread ground-contact width whose center is a tire equator, and shoulder portions respectively situated on opposite sides of the center portion. In each of the shoulder portions, shoulder main grooves extending inwardly from an outside relative to a tread ground-contact edge in the axial direction of the tire are arranged at certain intervals in the circumferential direction of the tire, whereby a shoulder land portion is established between the shoulder main grooves, a land ratio in each of the shoulder portion between the tread ground-contact edge and an outer edge of the center portion being 57 to 72%. In the center portion, between the shoulder land portions being arranged on opposite sides in the axial direction of the tire, at least one center block row having center blocks arranged in the circumferential direction at certain intervals is provided, a land ratio of the center portion being 40 to 55%. The center blocks are adjacent to the respective shoulder land portions, with a longitudinal groove-like portion extending in the circumferential direction of the tire being interposed therebetween. The longitudinal groove-like portion has a narrowed width portion whose width in the axial direction of the tire is 3 to 6 mm thereby establishing a minimum width, and increased width portions whose respective widths in the axial direction of the tire are gradually increased from the narrowed width portion toward the opposite sides in the circumferential direction of the tire.

Effect of the Invention

According to the first to third aspects of the present invention, the land ratio of the center portion and that of the shoulder portions are each limited to fall within a certain range, and the land ratio of the center portion is set to be smaller relative to that of the shoulder portions. This improves the drainage performance of the center portion, which inherently is weak at draining off the water. Further, though the shoulder portions are principally subjected to the lateral directional force when turning, owing to the fact that the shoulder portions are greater than the center portion in land ratio, high pattern rigidity and improved steering stability can be achieved.

According to the first aspect of the present invention, each of the center blocks has its width in the axial direction of the tire narrowed toward both the leading end and the trailing end relative to the tire rotating direction, and is provided, at the leading end thereof, with a tip portion that sharpens toward the leading end, and is provided, at the trailing end thereof, with a concave portion that smoothly concaves toward the leading end, so as to be substantially heart-shaped in its entirety. The tip portion of each of the center blocks can exhibit the water channeling effect, i.e., it can separate water layer on the road surface into two sides when grounding, and can efficiently guide the water along the outer sides of the center block. Further, while the water taken into the grooves tends to stand on the trailing end of each of the center blocks, the substantially heart-shaped center blocks each have the width narrowed also on the trailing end in terms of the tire rotation direction, and are each provided with the concave portion. Thus, the water sent around toward the rear of each block can fully be accumulated and reservoired. Accordingly, high wet grip performance can be exhibited. Still further, since the center block has its ratio (BL/BW) between the maximum width BW in the axial direction of the tire and the maximum length BL in the circumferential direction of the tire limited to 1.00 to 1.20, it exhibits high lateral rigidity. Accordingly, high steering stability can be achieved even when running on a wet road surface.

According to the second aspect of the present invention, a repetitively patterning pattern pitch that constitutes the tread pattern have a high land ratio region in which a sum of length in the axial direction of the tire of portions contacting the road surface on a tire axial line passing through the pattern pitch is 78 to 93% of the tread ground-contact width, and the high land ratio region is continuous in the circumferential direction of the tire by 20 to 35% of a length in the circumferential direction of the tire of the pattern pitch. Thus, the pattern rigidity can be maintained over the entire tread portion without impairing the drainage performance. Accordingly, high steering stability can be achieved even when running on a wet road surface.

According to the third aspect of the present invention, a longitudinal groove-like portion provided between each shoulder land portion and the center blocks has a narrowed width portion whose width in the axial direction of the tire is 3 to 6 mm thereby establishing the minimum width, and increased width portions whose respective widths in the axial direction of the tire are gradually increased from the narrowed width portion toward the opposite sides in the circumferential direction of the tire. Such a longitudinal groove-like portion can maintain the high rigidity of the ground contacting portions without impairing the drainage performance. In particular, the narrowed width portion increases torsional rigidity of the center blocks and the shoulder land portions that face the longitudinal groove-like portion, and suppresses distortion of such portions when a slip angle is applied. Accordingly, high steering stability can be achieved even when running on a wet road surface.

BRIEF DESCRIPTION OF NUMERALS

Figure 1:
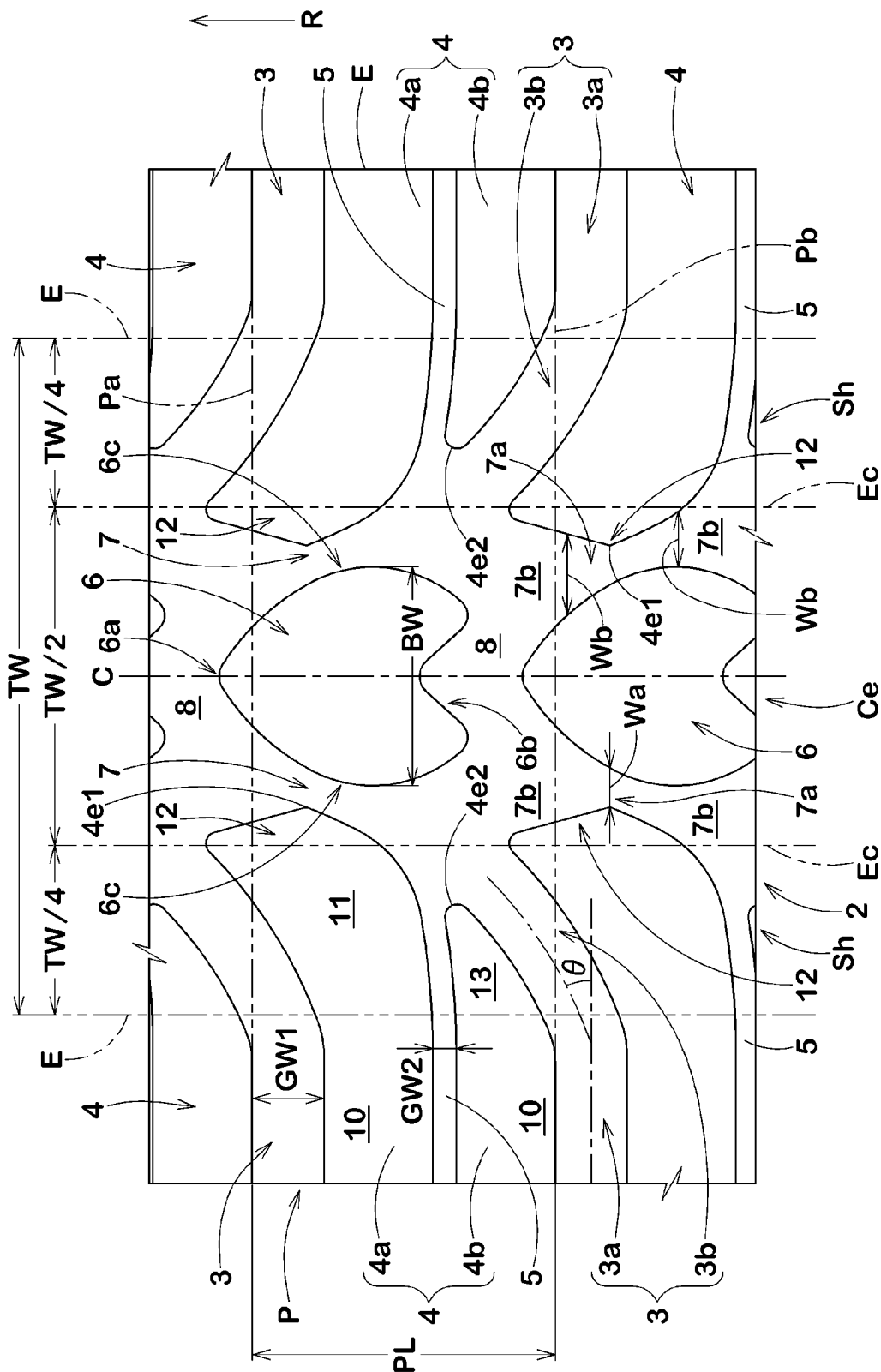
FIG. 1 is a developed view of a tread portion showing an embodiment of the present invention.

| | |
|---|---|
| 2 | tread portion |
| 3 | shoulder main groove |
| 4 | shoulder land portion |
| 4a | first shoulder block |
| 4b | second shoulder block |
| 5 | shoulder sub groove |
| 6 | center block |
| 6a | tip portion |
| 6b | concave portion |
| 7 | longitudinal groove-like portion |
| 7a | narrowed width portion |
| 7b | increased width portion |
| 12 | tapered portion |
| C | tire equator |
| Ce | center portion |
| E | tread ground-contact edge |
| Sh | shoulder portion |
| P | pattern pitch |
| Za | high land ratio region |
| Zb | low land ratio region |

BEST MODE FOR CARRYING OUT THE INVENTION

In the following, an embodiment of the present invention is described, referring to the drawings.

FIG. 1 is a developed view of a tread portion 2 of a pneumatic tire (not shown in its entirety) of the present embodiment. The pneumatic tire (not shown in its entirety) shown in FIG. 1 is suitably used as one of the front wheels of four-wheel racing karts.

The tread portion 2 is provided with a directional tread pattern. The directional tread pattern means a tread pattern whose performance differs depending on the rotation direction. Accordingly, in order to make full use of the performance of the pattern, a tire rotation direction R is indicated on the tire, and the tire is mounted on a vehicle according to the direction indication.

The tread portion 2 is partitioned into a center portion Ce making up 50% of a tread ground-contact width TW whose center is a tire equator C, and shoulder portions Sh situated on opposite sides of the center portion Ce. Here, the tread ground-contact width TW corresponds to a distance in the axial direction of the tire between tread ground-contact edges E, in a state where the tire is mounted on its normal rim and inflated to its normal internal pressure, and then loaded with a normal load so as to contact a level ground at a camber angle of 0 degrees.

The normal rim is a rim determined for each tire according to a standard on which the tire is based among standards for tires, e.g., the regular rim according to JATMA, the "Design Rim" according to TRA, the "Measuring Rim" according to ETRTO, and any rim recommended by the manufacturer when there is no corresponding standard.

The normal internal pressure is an air pressure determined for each tire according to a standard on which the tire is based among standards for tires, i.e., the maximum air pressure according to JATMA, the maximum value specified in Table "TIRE LOAD LIMITS AT VARIOUS COLD INFLATION PRESSURES" according to TRA, the "INFLATION PRESSURE" according to ETRTO, and any internal pressure recommended by the manufacturer when there is no corresponding standard. Note that, for a tire for use with a racing kart, the normal internal pressure is 100 kPa.

The normal load is a load determined for each tire according to a standard on which the tire is based among standards for tires, i.e., the maximum load capacity according to JATMA, the maximum value specified in Table "TIRE LOAD LIMITS AT VARIOUS COLD INFLATION PRESSURES" according to TRA, and the "LOAD CAPACITY" according to ETRTO. Note that, for a tire for use with a racing kart, the normal load is 392 N.

In each of the shoulder portions Sh, shoulder main grooves 3 extending inwardly from an outside in the axial direction of the tire relative to the tread ground-contact edge E are arranged at certain intervals in the circumferential direction of the tire. The shoulder main grooves 3 are at least long enough to reach from the tread ground-contact edge E to the center portion Ce. Thus, in each of the shoulder portions Sh, a shoulder land portion 4 is established between the shoulder main grooves 3 that are adjacent to each other in the circumferential direction of the tire. Note that, in the present embodiment, the opposite shoulder portions Sh are formed to be substantially line-symmetric about the tire equator C.

The shoulder main grooves 3 of the present embodiment are each structured to include an axially oriented portion 3a that extends on the outside relative to the tread ground-contact edge E in the axial direction of the tire so as to form an angle equal to or smaller than 5 degrees relative to the axial line of the tire, and an inclined portion 3b that is continuous from the axially oriented portion 3a and is inclined at an angle θ of approximately 15 to 45 degrees relative to the axial line of the tire so as to extend from the tread ground-contact edge E to the center portion Ce. The ratio of a length in the axial direction of the tire of the axially oriented portion 3a to that of the inclined portion 3b is desirably about 4:6 to 6:4. Preferably, the inclined portion 3b is inclined toward the leading end in terms of the tire rotation direction R.

Such an extending manner of the shoulder main grooves 3 to reach the center portion Ce improves the drainage performance of the center portion Ce which inherently is weak at draining off the water between itself and the road surface. The shoulder main grooves 3 utilize the pressure when contacting the ground, so as to pump out the water from the inclined portion 3b that preceedingly contacting the road surface to the axially oriented portion 3a, thereby effectively draining the water from the tread ground-contact edge E. While the axially oriented portion 3a of each of the shoulder main grooves 3 does not substantially contact the ground when running straight, it does when turning, in which situation the lateral force affects. Such an axially oriented portion 3a prevents a reduction in lateral rigidity on the outer side in the axial direction of the tire of each shoulder land portion 4 that contacts the ground when turning, and eventually contributes toward improving the steering stability.

Though a groove width GW1 (as measured to form a right angle with a groove center line) of each of the shoulder main grooves 3 is not particularly limited, the groove with an excessively narrow groove width GW1 tends to fail to exhibit adequate drainage performance. On the other hand, an excessively wide groove width GW1 may invite a reduction in pattern rigidity of the shoulder portions Sh, which may in turn invite a reduction in the steering stability. In consideration of the foregoing, the lower limit of the groove width GW1 is preferably equal to or greater than 6 mm, and more preferably, equal to or greater than 7 mm. The upper limit of the groove width GW1 is preferably equal to or smaller than 10 mm, and more preferably, equal to or smaller than 9 mm. Similarly, the lower limit of the depth of each of the shoulder main grooves 3 is preferably equal to or greater than 4 mm, and more preferably, equal to or greater than 5 mm, and its upper limit is preferably equal to or smaller than 7 mm and more preferably, equal to or smaller than 6 mm. As a matter of course, such a groove width and/or depth may be constant or may be partially varied.

Each of the shoulder land portions 4 of the present embodiment is made up of two large and small blocks 4a and 4b, as being divided into the two in the circumferential direction of the tire by a shoulder sub groove 5. This functions to improve the drainage performance of the shoulder portions Sh and wear resistance of the same by adjusting the pattern rigidity. Note that, in some cases, the shoulder land portion 4 is not divided by such a shoulder sub groove 5, and may be formed as a bulk block instead.

A groove width GW2 of the shoulder sub groove 5 is formed to be smaller than the groove width GW1 of the shoulder main groove 3. Though it is not specifically limited, in order to achieve a good balance between the drainage performance and the pattern rigidity of the shoulder portions Sh, the groove width GW2 is desirably about 1 to 5 mm, for example, and the groove depth thereof is desirably about 2 to 4 mm, for example. Note that the shoulder sub groove 5 of the present embodiment is formed to have a substantially constant width.

The shoulder sub groove 5 is positioned at substantially the central position between the shoulder main grooves 3 that are adjacent in the circumferential direction of the tire to each other, so as to extend inwardly from the outside relative to the tread ground-contact edge E in the axial direction of the tire and substantially in parallel with the tire axial line. Here, the manner "substantially in parallel with the tire axial line" includes at least a manner in which the groove centerline axially extends within a deviation range of 5 mm in the circumferential direction of the tire. Further, in a preferred embodiment, an inner end of the shoulder sub groove 5 in the axial direction of the tire is preferably communicates with the inclined portion 3b of the shoulder main groove 3, so as to provide a wide drainage/reservoir space in there. In consideration of the foregoing, the intersection of these grooves is desirably provided near the boundary between the center portion Ce and the shoulder portion Sh.

Each of the shoulder land portions 4 is made up of a first shoulder block 4a being arranged on the leading end in terms of the tire rotation direction R, and a second shoulder block 4b being arranged on the trailing end and being smaller than the first shoulder block 4a in ground contact area.

The first shoulder block 4a of the present embodiment has an inner end portion in the axial direction of the tire 4e1 that intrudes and terminates in the center portion Ce. The first shoulder block 4a includes a body portion 10 being formed between the axially oriented portion 3a of the shoulder main groove 3 and the shoulder sub groove 5 and being substantially constant in its length in the circumferential direction of the tire, a gradually increased portion 11 being continuously formed from the body portion 10 to reach the center portion Ce and being gradually increased in its length in the circumferential direction of the tire, and a tapered portion 12 being continuous from the gradually increased portion 11 and being gradually reduced in its length in the circumferential direction of the tire up to the inner end portion 4e1. The tapered portion 12 is shaped to be a substantially isosceles triangle as seen two-dimensionally.

On the other hand, an inner end portion in the axial direction of the tire 4e2 of the second shoulder block 4b terminates before reaching the center portion Ce. That is, the second shoulder block 4b is formed to be smaller than the first shoulder block 4a in length in the axial direction of the tire. Further, the second shoulder block 4b is made up of a body portion 10 being formed between the axially oriented portion 3a of the shoulder main groove 3 and the shoulder sub groove 5 and being substantially constant in its length in the circumferential direction of the tire, and a tapered portion 13 being formed between the inclined portion 3b of the shoulder main groove 3 and the shoulder sub groove 5 and being gradually reduced in its circumferential length up to the inner end portion 4e2. Note that, in each of the first and second shoulder blocks 4a and 4b, the body portion 10 can contact the road surface principally only when turning.

Next, in the center portion Ce, between the shoulder land portions 4 being arranged on the opposite sides in the axial direction of the tire, at least one center block row is provided. The center block row is formed by center blocks 6 being arranged in the circumferential direction at certain intervals. The only land portions that contact the road surface of the tread portion 2 of the present embodiment are the center blocks 6 and the shoulder land portions 4.

In the center portion Ce, longitudinal groove-like portions 7 extending in the circumferential direction of the tire are each formed between the row of center blocks 6 and each of the shoulder land portions 4, and a substantially v-shaped transverse groove-like portions 8 extending in the axial direction of the tire is formed between the center blocks 6.

Here, with the pneumatic tire of the present embodiment, the land ratio in each shoulder portion Sh between the tread ground-contact edge E and the outer edge Ec of the center portion Ce (hereinafter, the land ratio of such a region may simply be referred to as the "land ratio of the shoulder portions Sh") is set to be 57 to 72%, and the land ratio of the center portion Ce is set to be 40 to 55%. In this manner, by setting the land ratio of the center portion Ce to be smaller than the land ratio of the shoulder portion Sh, the drainage performance of the center portion Ce, which inherently is weak at draining off the water, can be improved. Further, though the shoulder portions Sh are principally subjected to the lateral force when turning, owing to the fact that the shoulder portions Sh are greater than the center portion Ce in land ratio, high pattern rigidity can be maintained so as to improve the steering stability.

When the land ratio of the center portion Ce is smaller than 40%, the pattern rigidity of the center portion Ce significantly reduces, which in turn impairs the steering stability. In particular, when used as the front tires, the steering response becomes poor and a good time cannot be achieved when driven with such tires in a circuit. Additionally, when the land ratio of the center portion Ce exceeds 55%, the drainage performance of the center portion Ce significantly reduces, which in turn results in inadequate grip on the wet road surface. In consideration of the foregoing, particularly, the land ratio of the center portion Ce is desirably equal to or greater than 43% and equal to or smaller than 47%.

On the other hand, when the land ratio of the shoulder portion Sh is smaller than 57%, the pattern rigidity of the shoulder portion Sh reduces, which in turn impairs stability when turning. On the contrary, when the land ratio of the shoulder portion Sh exceeds 72%, the drainage performance when turning significantly reduces, which in turn results in inadequate grip or severely impaired controllability when skidding. In consideration of the foregoing, particularly, the land ratio is desirably equal to or greater than 62% and equal to or smaller than 70%.

Note that, the land ratio of the center portion Ce should be obtained based on the ratio between the entire area Ca of the center portion Ce for one complete circumference of the tire, and a sum Cc of the ground contact areas of the center portion Ce for one complete circumference of the tire (Cc/Ca). Similarly, the land ratio of the shoulder portion Sh should be obtained based on the ratio between the entire area Sa of the region between the outer edge Ec of the center portion Ce and the tread ground-contact edge E for one complete circumference of the tire, and a sum Sc of the ground contact areas in such a region for one complete circumference of the tire (Sc/Sa).

Figure 2:
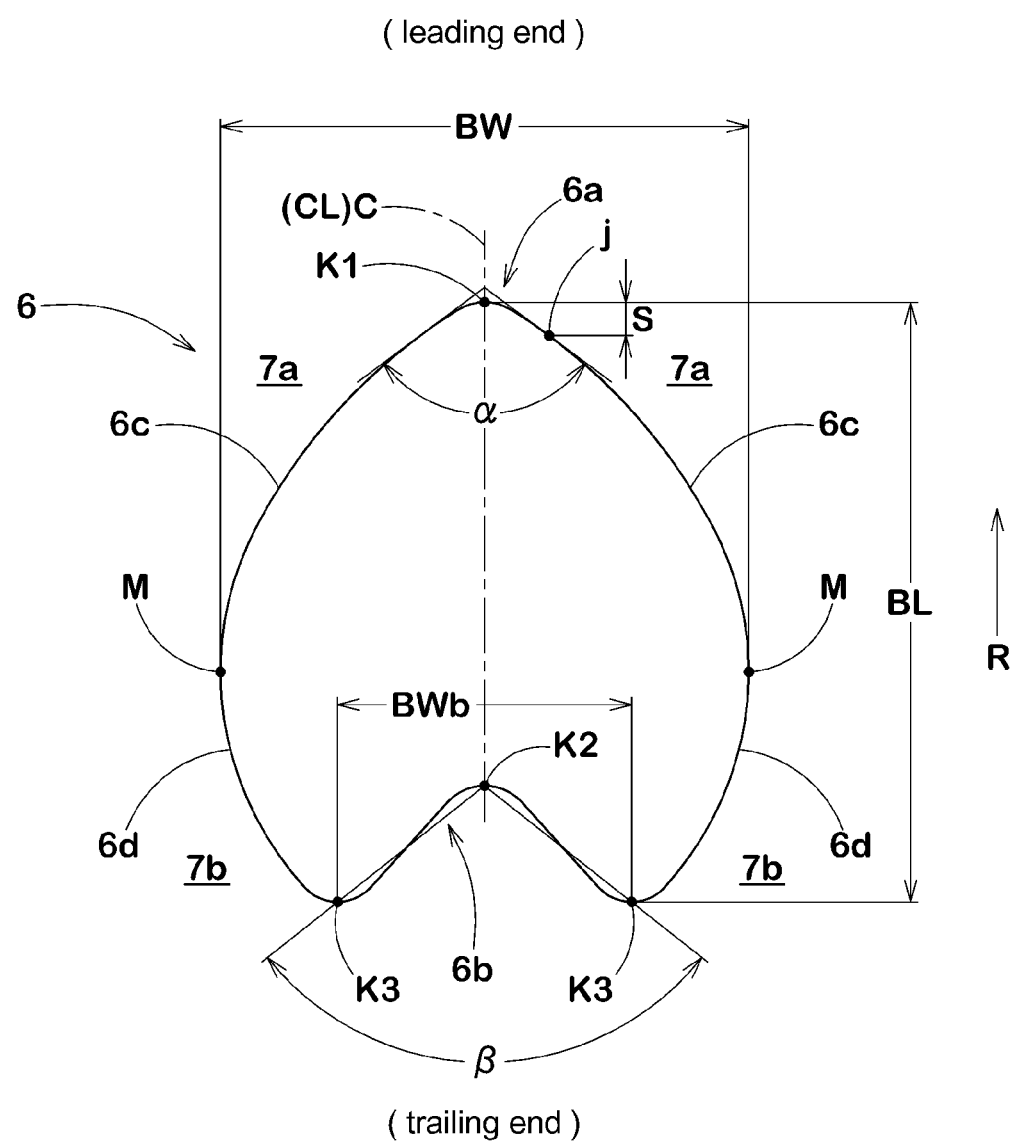
FIG. 2 is an enlarged view of a center block thereof.

According to the first aspect of the present invention, the center block row is formed one in number, and the tread of the center block 6 is formed to be substantially heart-shaped, whose enlarged view is shown in FIG. 2. Specifically, the center blocks 6 are arranged so as not to extend over the edge of the center portion Ce and such that their respective centers are aligned with the tire equator C. The contour of the tread of each center block 6 is shaped such that: the width is gradually reduced from bulged positions M establishing the maximum width BW in the axial direction of the tire toward both the leading end and the trailing end in terms of the tire rotation direction R; on the leading end, a tip portion 6a that sharpens toward the leading end is provided; and at the end portion on the trailing end, a concave portion 6b that smoothly concaves toward the leading end is provided. An apex K1 of the tip portion 6a and each bulged position M are connected by a smooth first arc portion 6c. Also, each bulged position M and each endmost point K3 of the center block 6 positioned on the most trailing end in terms of the tire rotation direction are connected by a smooth second arc portion 6d. In this manner, the contour of the tread of the center block 6 of the present embodiment is formed to be substantially heart-shaped that is substantially line-symmetric about the tire equator C. In particular, the tread pattern of the present embodiment is structured to be substantially line-symmetric in its entirety about the tire equator C. Note that, the bulged positions M are each desirably arranged at a position away from the apex K1 toward the trailing end by a distance 0.5 to 0.7 times as long as the length BL of the block in the circumferential direction.

When running straight on a wet road surface, the center block 6 structured in the manner as described above is capable of separating a layer of water on the road surface into two sides by the tip portion 6a that first contacts the road surface, and is capable of guiding the water along the smooth arc portions 6c toward the rear side. Here, since the center block 6 has its width in the axial direction of the tire narrowed from the bulged positions M toward the leading end in terms of the tire rotation direction R, the center block 6 can effectively separate the water into two sides and smoothly sending them toward the rear side (water channeling effect). Further, while the water tends to stand, inherently, on the trailing end of the center block 6, owing to the fact that the width in the axial direction of the tire is narrowed also from the bulged position M toward trailing end, and that the concave portion 6b is provided, the water sent around toward the trailing end of the block in terms of rotation direction can be reservoired so as not to overflow. Accordingly, high wet grip performance can be exhibited. In order to enhance such an effect further, a rear end width BWb being a distance between the endmost points K3 of the center block 6 in the axial direction of the tire is desirably 50 to 67% of the maximum width BW of the center block 6.

The center block 6 desirably has a ratio (BL/BW) between the maximum width BW in the axial direction of the tire and the maximum length BL in the circumferential direction of the tire of 1.00 to 2.20. When the ratio (BL/BW) is smaller than 1.00, the rigidity in the circumferential direction of the center block 6 reduces, and deformation when braking or driving becomes great. This eventually develops a tendency to fail to achieve adequate braking force or driving force. In contrast, when the ratio (BL/BW) exceeds 2.20, the rigidity in the axial direction of the tire reduces and, therefore, lateral force may not fully be exhibited when turning. In particular, when applied to the front tires of a racing kart, a great slip angle is applied thereto when turning. Accordingly, in order to fully enhance the lateral rigidity of the center block 6, the ratio (BL/BW) is desirably 1.00 to 1.20. On the other hand, when applied to the rear tires of a racing kart, it is subjected to great shear force that is produced between itself and the road surface. Accordingly, in order to enhance the rigidity in the circumferential direction of the tire when driving, the ratio (BL/BW) is desirably greater, i.e., as great as 1.70 to 2.20.

As shown in FIG. 2, the tip portion 6a of the center block 6 has desirably an interior angle α of 100 to 130 degrees. This manner is desirable in that the tip portion 6a can more effectively separate the water layer into two sides when contacting the road surface, and in achieving the efficient water channeling effect of separating the water layer into two when contacting the road surface and guiding the water to the opposite outer sides relative to the center block 6. Note that, when the interior angle α of the tip portion 6a is smaller than 100 degrees, the rigidity of the tip portion 6a reduces and the steering response tends to become poor. In contrast, when the interior angle α exceeds 130 degrees, the water channeling effect tends to be weakened. Note that, when the tip portion 6a is formed by smooth arcs as in the present embodiment, the interior angle α of the tip portion 6a is measured as an angle formed between tangents each contacts the center block 6 at a position j that is away by a distance S of 2 mm in the circumferential direction of the tire from the apex K1 towards the trailing end in terms of the tire rotation direction R, in the tread.

In the concave portion 6b of the center block 6, it is desired that a crossing angle β is smaller than the interior angle α of the tip portion. The angle β is formed between lines each drawn from a most concave point K2 positioned on the most leading end in terms of the tire rotation direction R in the concave portion 6b to the endmost point K3 positioned on either axial side and on the most trailing end in terms of the tire rotation direction R. In particular, a difference between the angles β and α, i.e., (α−β), is desirably 10 to 25 degrees. That is, when the angular difference (α−β) is smaller than 10 degrees, the water flowing from an increased width portion 7b into the concave portion 6b may hinder the existing water in the concave portion 6b from being drained. In contrast, when the difference exceeds 25 degrees, the drainage toward diagonally rear line tends to become difficult, e.g., the water in the concave portion 6b collides against the tip portion 6a of another center block that is positioned on the trailing end relative to the tire rotation direction, relative to the concave portion 6b of the pertinent center block.

Figure 3:
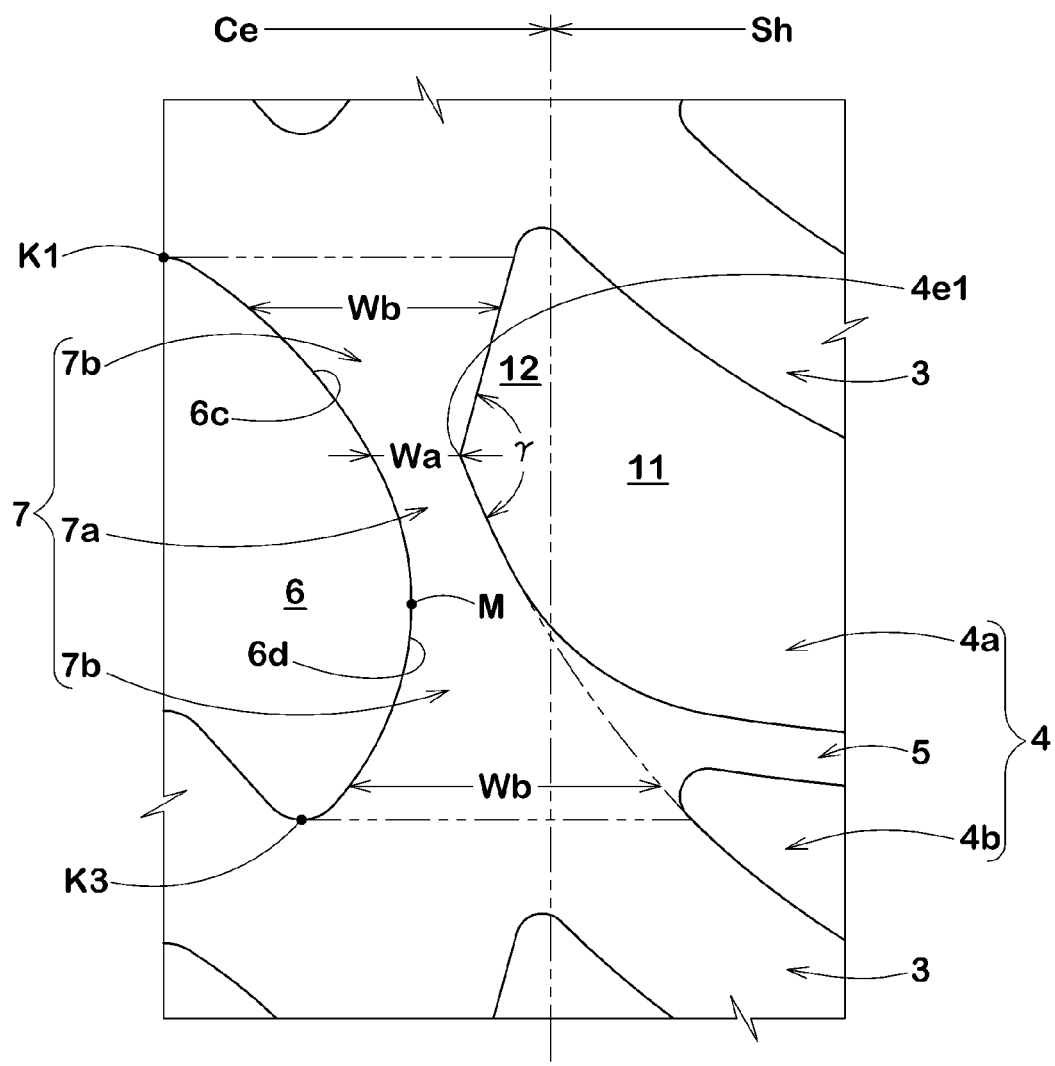
FIG. 3 is an enlarged view of a longitudinal groove-like portion.

According to the third aspect of the present invention, as shown in FIG. 1 and also in FIG. 3 being a principal portion enlarged view of FIG. 1, the longitudinal groove-like portion 7 includes a narrowed width portion 7a whose width in the axial direction of the tire is 3 to 6 mm thereby establishing the minimum width, and increased width portions 7b whose respective widths in the axial direction of the tire are gradually increased with distance from the narrowed width portion 7a in the circumferential opposite directions. Specifically, the first arc portion 6c and/or the second arc portion 6d of the center block 6 are/is arranged so as to face the tapered portion 12 of the shoulder land portion 4 (the first shoulder block 4a). In this manner, in the longitudinal groove-like portion 7, the narrowed width portion 7a is formed by the inner end portion 4e1 forming the axially inward apex of the tapered portion 12, and the increased width portions 7b are formed on opposite sides of the narrowed width portion 7a.

The increased width portions 7b can each provide a fully wide drainage/reservoir space and, therefore, they are desirable in being capable of smoothly guiding the water on the road surface to the longitudinal groove-like portion 7 when the center block 6 starts to contact the ground, and being capable of efficiently draining the water. Further, since the increased width portions 7b each communicate with the transverse groove-like portion 8, they can effectively drain also the water reservoired in the concave portion 6b and the transverse groove-like portion 8 toward the trailing end in terms of the tire rotation direction R. Further, as can be seen from FIG. 3, the inner end in the axial direction of the tire of the shoulder main groove 3 and that of the shoulder sub groove 5 both communicate with the increased width portion 7b. Accordingly, the drainage guided to the increased width portion 7b on the trailing end in terms of the tire rotation direction R can efficiently be drained through the shoulder main groove 3 and the shoulder sub groove 5 from the tread ground-contact edge E to the outside. In order to further surely achieve the effects described above, it is desirable that the width in the axial direction of the tire Wb of the increased width portion 7b has a portion being preferably equal to or greater than 3 mm, more preferably equal to or greater than 4 mm, and still more preferably equal to or greater than 8 mm.

On the other hand, when the width of the longitudinal groove-like portion 7 is increased for the purpose of improving the drainage performance, the rigidity of that portion reduces and the steering stability (turning performance) tends to become poor. However, by providing the longitudinal groove-like portion 7 with the narrowed width portion 7a and the increased width portions 7b, the reduction in the steering stability is prevented without impairing the drainage performance. In particular, the narrowed width portion 7a partially increases the torsional rigidity of the center block 6 and the shoulder land portion 4 respectively positioned on the axially opposite sides of the narrowed width portion 7a, and suppresses great distortion of such portions even when a slip angle is applied. Accordingly, high steering stability can be achieved even when running on a wet road.

Note that, when a groove width Wa of the narrowed width portion 7a is smaller than 3 mm, the drainage resistance of this portion increases, which in turn may cause a reduction in the grip performance when running on a wet road. On the other hand, when the groove width Wa of the narrowed width portion 7a is greater than 6 mm, the pattern rigidity, in particular the torsional rigidity, of the tread portion 2 reduces, which in turn may reduce the steering stability.

As shown in FIG. 3, an interior angle γ of the tapered portion 12 of the first shoulder block 4a is desirably 100 to 150 degrees. When the interior angle γ is smaller than 100 degrees, the tapered portion 12 becomes excessively sharp, and the rigidity in the axial direction of the tire and the torsional rigidity tend to reduce. This may impair responsiveness at the beginning of steering. In contrast, when the interior angle γ exceeds 150 degrees, the increased width portions 7b being wide enough cannot be formed in the longitudinal groove-like portion 7, and the improvement of the wet performance may not fully be expected. In consideration of the foregoing, the interior angle γ is preferably equal to or greater than 120 degrees, and desirably equal to or smaller than 145 degrees.

The tread portion 2 is formed by repetitive arrangement of a substantially identical pattern pitch P in the circumferential direction of the tire. As shown in FIG. 1, in the present embodiment, the pattern pitch P is made up of one shoulder main groove 3 and one shoulder land portion 4 being adjacent thereto (i.e., the portion between lines Pa and Pb). As it is specified to be "substantially identical", by definition, the pitch variation scheme may be adopted in accordance with customary practices, in which a plurality of types of length in the circumferential direction of the tire PL of the pattern pitch P are provided so as to disperse the running noise. Note that it is desirable that the tread portion 2 is preferably constituted of 18 to 25 pieces of pattern pitches P per one tire circumference.

Figure 4:
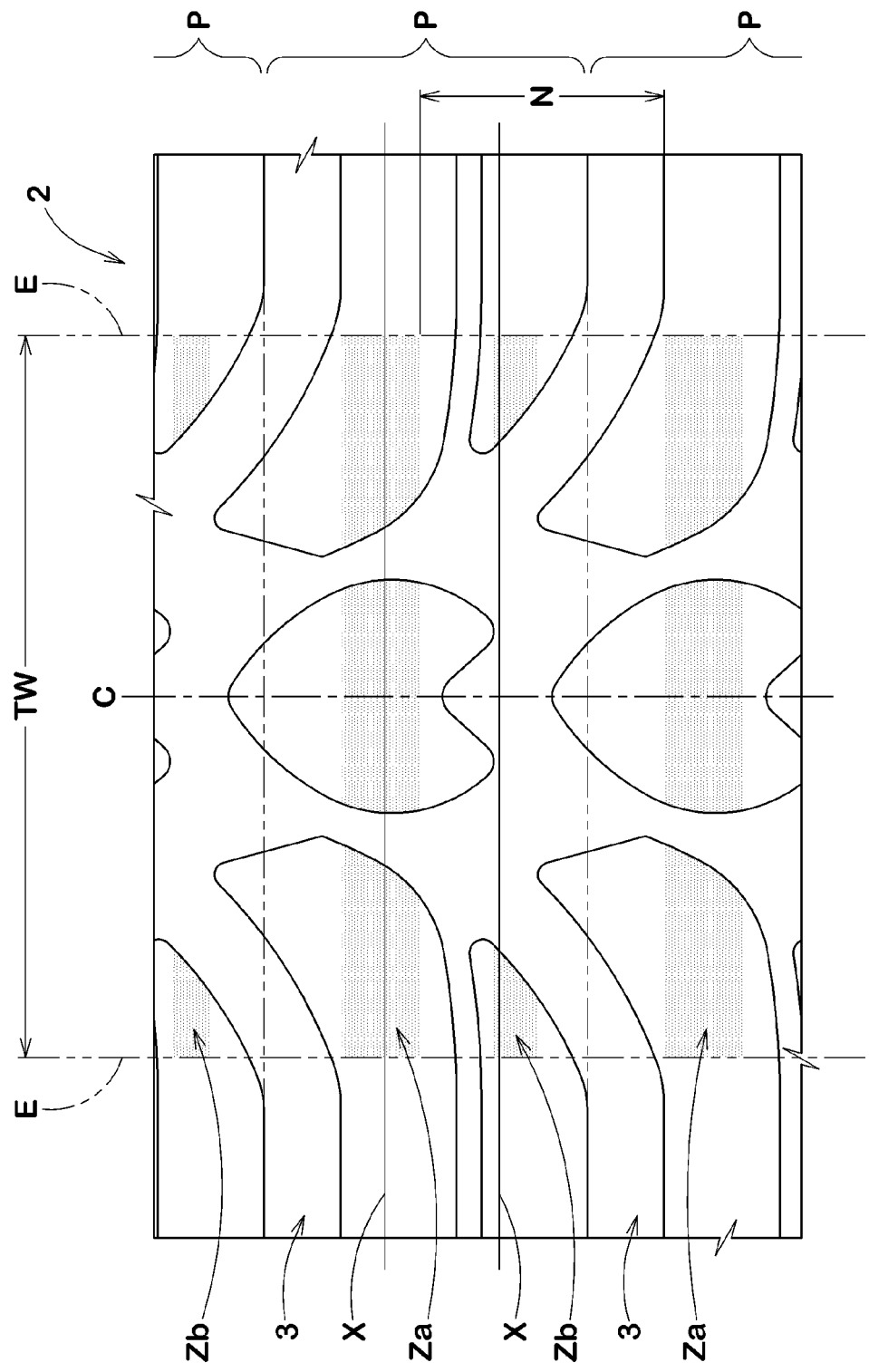
FIG. 4 is a developed view of the tread portion showing high land ratio regions and low land ratio regions.
Figure 5:
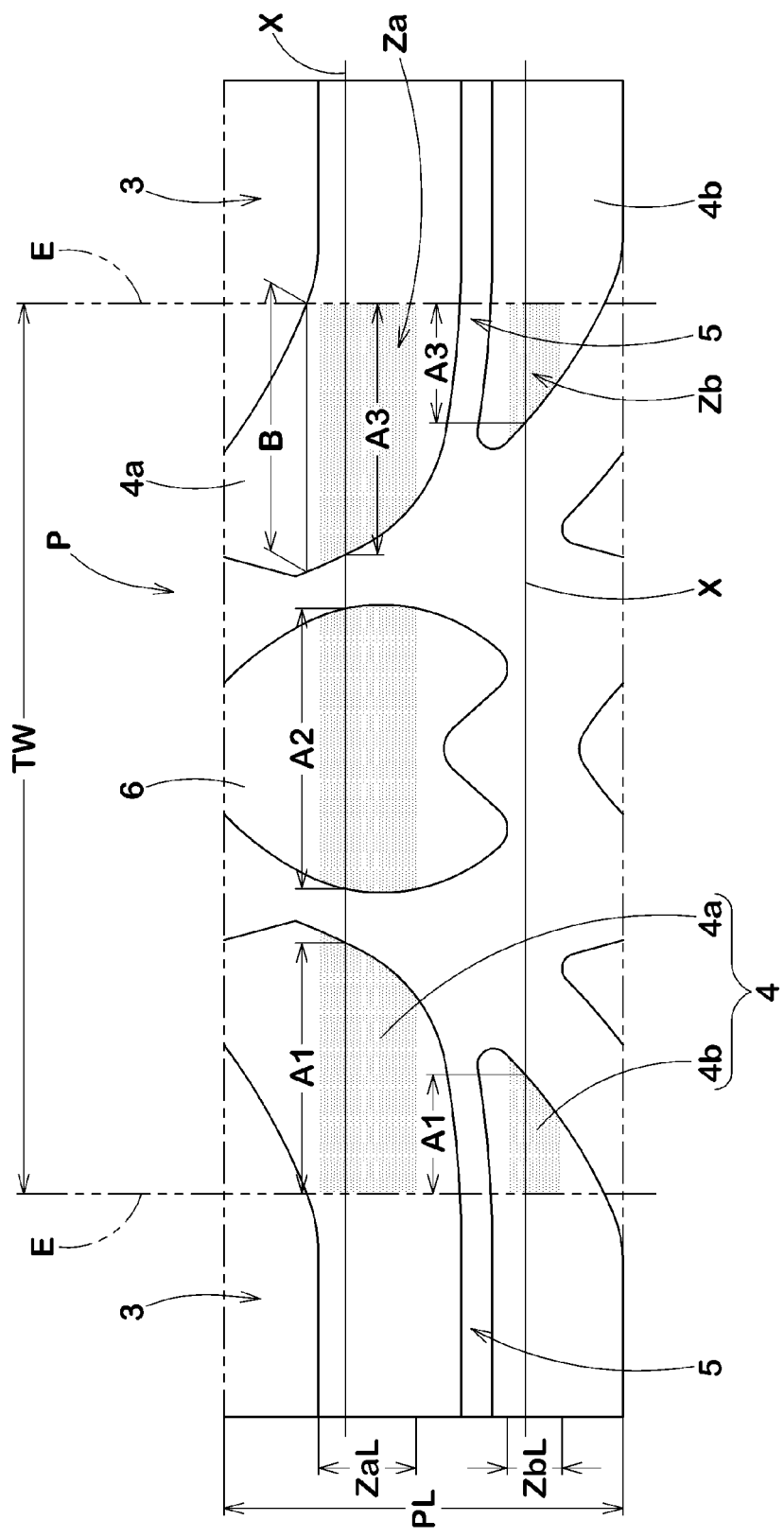
FIG. 5 is a partial enlarged view of a pattern pitch.

According to the second aspect of the present invention, as shown in FIG. 4 and also in FIG. 5 being an enlarged view of FIG. 4, each of the pattern pitches P has a high land ratio region Za whose definition will follow. The high land ratio region Za means a region in which the sum of length in the axial direction of the tire of portions (which are positioned between the tread ground-contact edges E) that contact the road surface on a tire axial line X that passes through the pattern pitch P, that is, as shown in FIG. 5, the sum of a ground contact length in the axial direction of the tire A1 of one shoulder land portion 4, a ground contact length A2 of the center block 6, and a ground contact length A3 of the other shoulder land portion 4 (i.e., A1+A2+A3) is 78 to 93% of the tread ground-contact width TW. The high land ratio region Za is circumferentially continuous by a circumferential length ZaL which is 20 to 35% of a length in the circumferential direction of the tire PL of the pattern pitch P.

Because such a high land ratio region Za can achieve an adequate ground contact area when running, high grip performance can be exhibited when running straight and when turning. Further, because the high land ratio region Za is provided in each pattern pitch P, the high land ratio regions Za can be successively brought into contact with the ground when the tire rotates. Therefore, the pattern rigidity can fully be maintained without impairment of the drainage performance over the entire tread portion 2, which eventually contributes toward improving the steering stability on a wet road surface.

In particular, a maximum ground contact length in the axial direction of the tire B of the shoulder land portion 4 (the first shoulder block 4a) is desirably more than 30% of the tread ground-contact width TW and no more than 40% of that. This surely enhances the rigidity of the shoulder land portions 4 which are subjected to great lateral force when turning, and drastically improves the turning performance.

Note that, when the sum of the ground contact lengths on the tire axial line X is less than 78% of the tread ground-contact width TW, the grip force may become weak due to the inadequate ground contact area. In contrast, when the sum of the ground contact lengths is more than 93% of the tread ground-contact width TW, the drainage performance is significantly impaired in the high land ratio region Za, under which condition the tire tends to ride on a water layer, i.e, what is called a hydroplaning phenomenon tends to occur.

When the length in the circumferential direction of the tire ZaL of the high land ratio region Za is less than 20% of the length in the circumferential direction of the tire PL of the pattern pitch P, the rigidity of the pattern pitch cannot fully be enhanced, and therefore the turning performance cannot fully be improved. On the other hand, when the length ZaL of the high land ratio region Za is more than 35% of the length in the circumferential direction of the tire PL of the pattern pitch P, the drainage performance in this portion is significantly impaired, under which condition the hydroplaning phenomenon tends to occur. In consideration of the foregoing, it is preferable that the length ZaL of the high land ratio region Za is desirably at least 25% of the length PL of the pattern pitch P, and desirably not more than 32% of that. Note that such a high land ratio region Za can be formed such that its value falls within the range described above by adjusting the shape of the center blocks 6 and the shoulder land portions 4 as well as their relative positions in the circumferential direction of the tire.

As shown in FIG. 4, it is desirable that an interval in the circumferential direction of the tire N of the high land ratio region Za (an length in the circumferential direction of the tire of a portion defined by adjacent high land ratio regions in the circumferential direction of the tire Za) is preferably equal to or greater than 30 mm, and more preferably equal to or greater than 35 mm, and preferably equal to or smaller than 60 mm, and more preferably equal to or smaller than 55 mm. When the interval is smaller than 30 mm, the drainage performance may be weakened. In contrast, when the interval exceeds 60 mm, the period during which the high land ratio region Za exists within the ground contact surface while the tire rotates becomes short, under which condition the effect of enhanced grip performance may not fully be achieved.

Further, as shown in FIGS. 4 and 5, it is desirable that each pattern pitch P has a low land ratio region Zb in which the sum of length in the axial direction of the tire of portions that contact the road surface on a tire axial line X that passes through the pattern pitch P is 25 to 35% of the tread ground-contact width TW. It is desirable that the low land ratio region Zb is continuous in the circumferential direction of the tire by a length ZbL which is 10 to 20% of the length in the circumferential direction of the tire PL of the pattern pitch P.

By providing the pattern pitch P with the high land ratio region Za and the low land ratio region Zb whose land ratio is substantially half as great as that of the high land ratio region Za, a higher-level balance between the grip performance and the drainage performance can be achieved. Note that, when the length in the circumferential direction of the tire ZbL of the low land ratio region Zb is less than 10% of the length PL of the pattern pitch P, the low land ratio region Zb may not exhibit adequate drainage effect. In contrast, when the length in the circumferential direction of the tire ZbL of the low land ratio region Zb is more than 20% of the length PL of the pattern pitch P, the pattern rigidity of the tread portion 2 reduces, under which condition the steering stability may be impaired. Note that, the highland ratio region Za and the low land ratio region Zb are shaded with light gray in FIGS. 4 and 5 for easier understanding.

Figure 6:
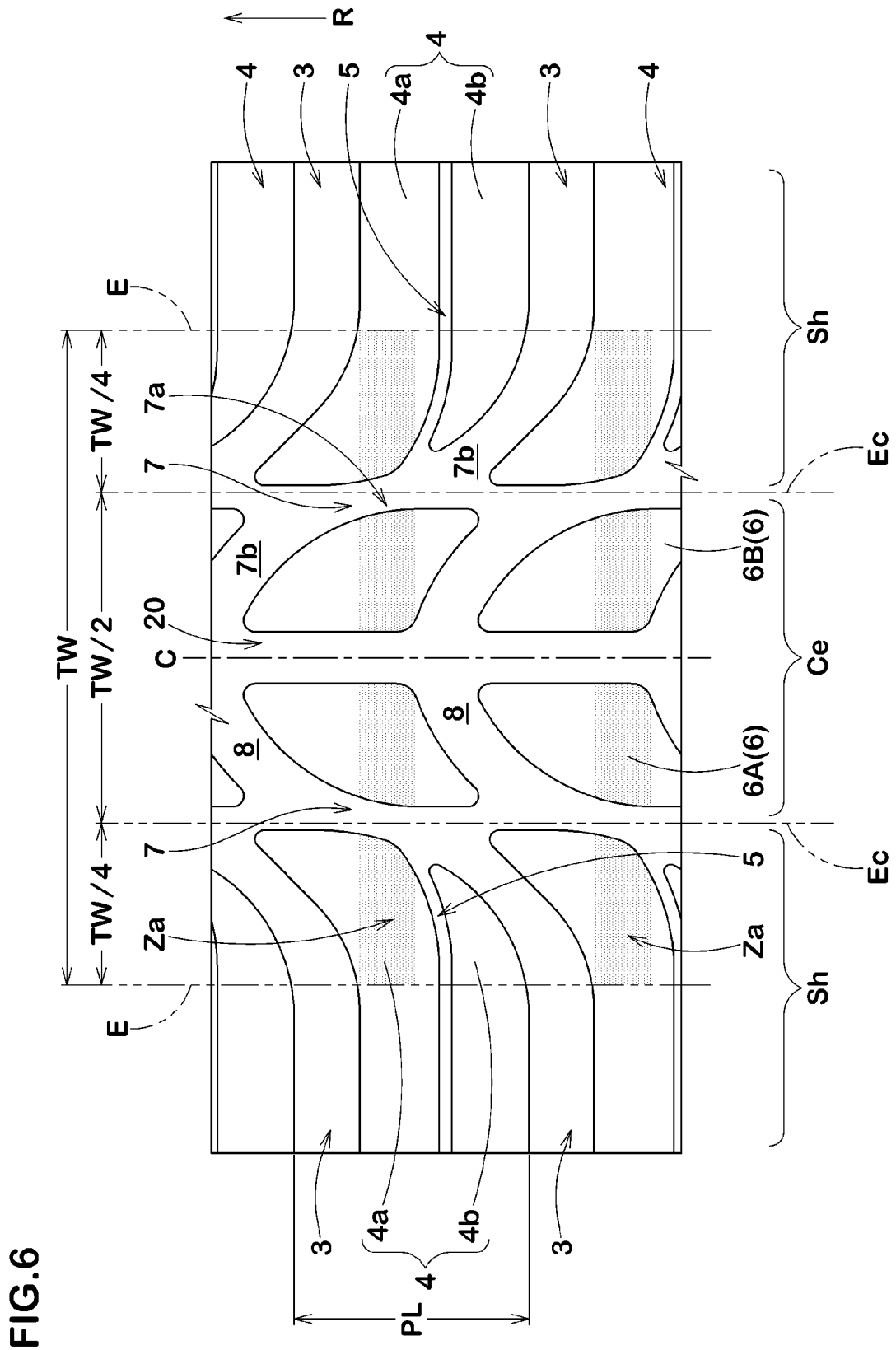
FIG. 6 is a developed view of a tread portion showing another embodiment of the present invention.

FIG. 6 shows another embodiment according to the second aspect of the present invention. In the present embodiment, the center portion Ce is provided with a center main groove 20 that linearly extends on the tire equator C, and a pair of center blocks 6A and 6B that are arranged on the opposite sides of the center main groove 20. Such a center portion Ce exhibits a further improved drainage performance and, therefore, is suitably used, e.g., as one of the rear wheels of a racing kart, which are required to exhibit great grip force. As has been described, according to the second and the third aspects of the present invention, various modifications can naturally be applied to the specific shape of each of the center blocks 6 and the like. In the present embodiment also, the high land ratio region Za is provided at a region shown as being shaded with gray. Note that, between the center block 6A (or 6B) and the shoulder land portion 4, the longitudinal groove-like portion 7 having the narrowed width portion 7a and the increased width portions 7b according to the third aspect of the present invention is arranged.

While the embodiments of the present invention have been described in the foregoing, the present invention is not limited to the embodiments described above, and can be practiced as being modified in various manners.

EXAMPLE A

In order to verify the effects of the first aspect of the present invention, pneumatic tires (size: 10×4.50-5) for use as front wheels of a racing kart were prototyped based on the specifications listed in Table 1. They were tested for various performances. As rear wheels of the racing kart, tires each having a size of 11×6.50-5 were mounted. The test methods are as follows.

<Lap Time>

The test tires were mounted on a racing kart (FA category vehicle) under the conditions for the rim (front wheels: 4.50 inches; rear wheels: 6.50 inches) and the internal pressure 100 kPa (common to front and rear). The kart was then driven by a holder of the kart international racing license to run five laps at full throttle around the Tsumagoi International Kart Course under a wet condition, to obtain an average lap time per a lap. It is to be noted that, in order to achieve consistency of the wet condition, the equivalent amounts of water were sprinkled immediately before running.

<Steering Stability>

With the full throttle running under the wet condition as stated above, the responsiveness to steering (steering responsiveness performance), the gripping state when turning (lateral grip performance) and the responsiveness when accelerated (acceleration performance) were sensory evaluated by the driver according to the five-point method. The greater the numerical values, the better the results. The test results and others are shown in Table 1.

Figure 7:
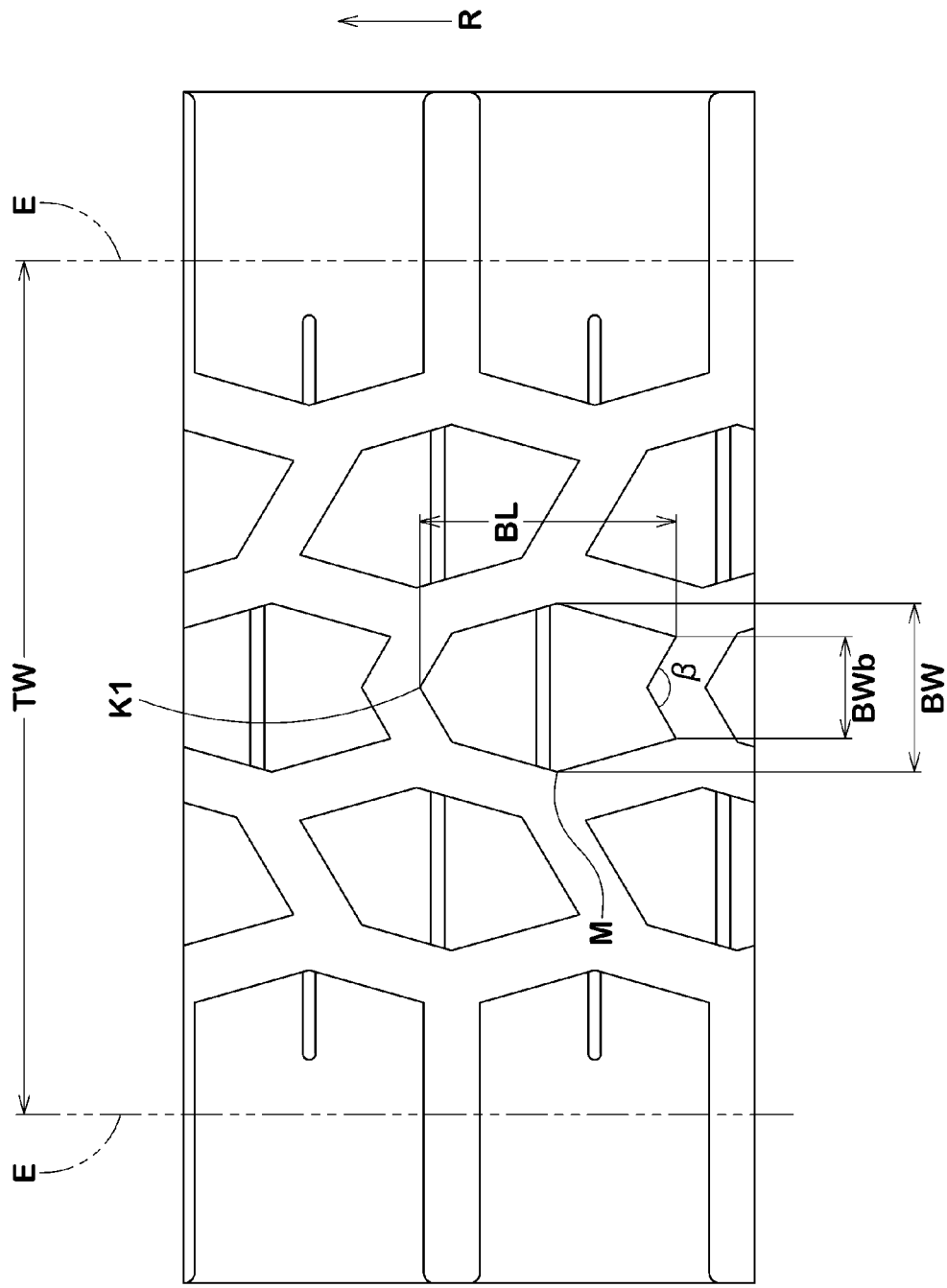
FIG. 7 is a developed view of a tread portion of a front tire of a comparative example 1.
Figure 8:
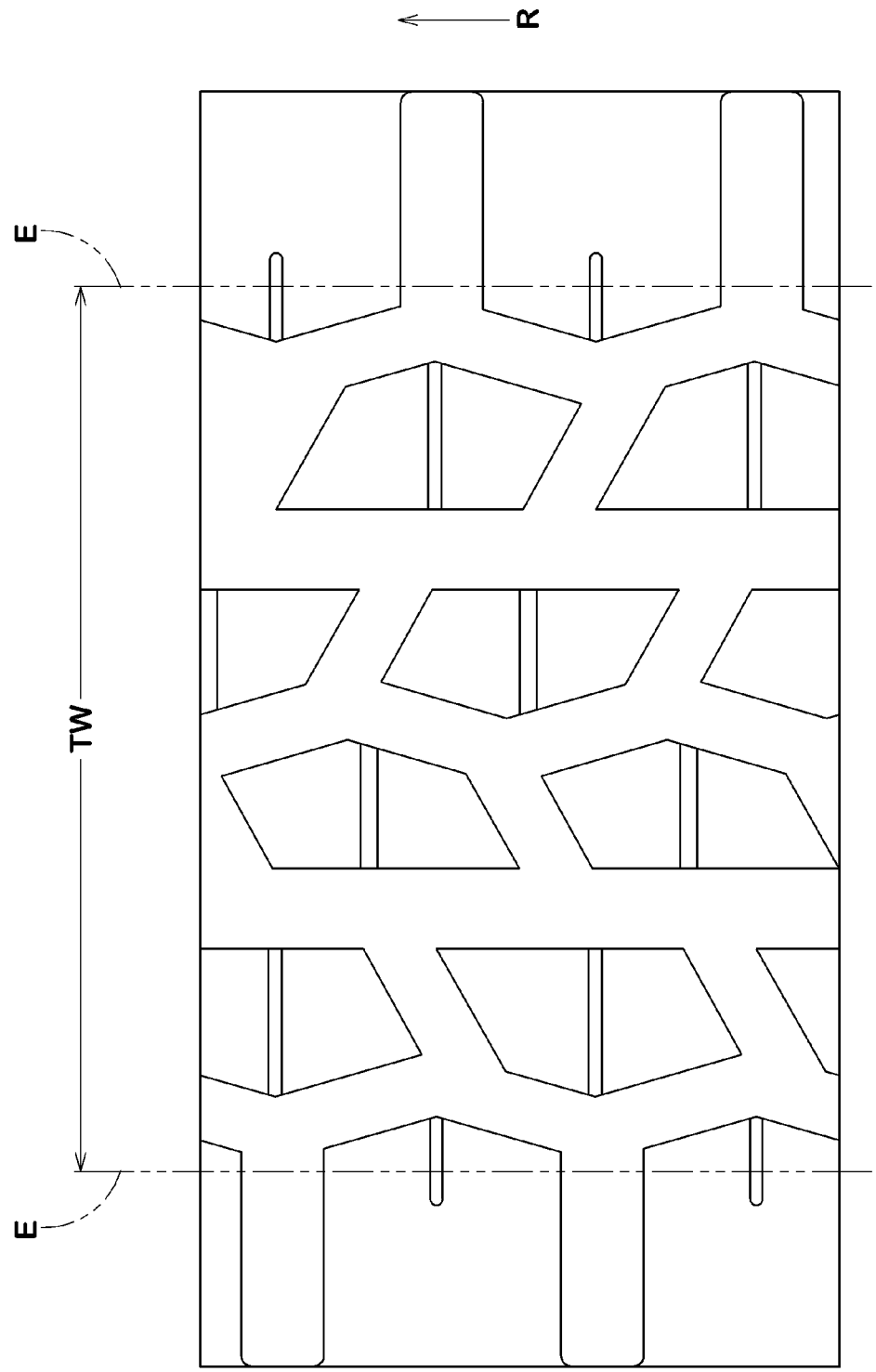
FIG. 8 is a developed view of a tread portion of a rear tire of the comparative example 1.

|  | Comparative example A1 | Comparative example A2 | Comparative example A3 | Comparative example A4 | Comparative example A5 | Inventive example A1 | Inventive example A2 | Inventive example A3 |
|---|---|---|---|---|---|---|---|---|
| <Front tire> | | | | | | | | |
| Tread pattern view | FIG. 7 | FIG. 1 | FIG. 1 | FIG. 1 | FIG. 1 | FIG. 1 | FIG. 1 | FIG. 1 |
| Land ratio of center portion (%) | 59 | 35 | 60 | 35 | 52 | 46 | 50 | 55 |
| Land ratio of shoulder portion (%) | 70 | 66 | 66 | 72 | 68 | 63 | 61 | 63 |
| Ratio (BL/BW) | 1.5 | 1.15 | 1.15 | 0.95 | 1.25 | 1.15 | 1.05 | 1.20 |
| Internal angle $\alpha$ of tip portion (degree) | 120 | 120 | 120 | 90 | 135 | 120 | 123 | 130 |
| Angle $\beta$ of concave portion (degree) | 120 | 102 | 102 | 78 | 102 | 102 | 105 | 112 |
| Difference of angle ($\alpha - \beta$) (degree) | 0 | 18 | 18 | 12 | 33 | 18 | 18 | 18 |
| Ratio (BWb/BW) | 0.61 | 0.56 | 0.56 | 0.56 | 0.50 | 0.56 | 0.67 | 0.56 |
| Bulged position of center block M * | 0.53 | 0.61 | 0.61 | 0.61 | 0.61 | 0.61 | 0.61 | 0.61 |
| <Rear tire> | | | | | | | | |
| Tread pattern view | FIG. 8 | FIG. 6 | FIG. 6 | FIG. 6 | FIG. 6 | FIG. 6 | FIG. 6 | FIG. 6 |
| Land ratio of center portion (%) | 40 | 45 | 45 | 45 | 45 | 45 | 45 | 45 |
| Land ratio of shoulder portion (%) | 64 | 64 | 64 | 64 | 64 | 64 | 64 | 64 |
| <Test results> | | | | | | | | |
| Lap time (sec) | 42.1 | 42.4 | 42.3 | 42.5 | 42.0 | 41.5 | 41.4 | 41.6 |
| Steering responsiveness (five-point method) | 3.0 | 2.7 | 3.2 | 2.6 | 3.5 | 4.2 | 4.3 | 4.1 |
| Lateral grip performance (five-point method) | 3.0 | 2.8 | 2.9 | 2.6 | 3.2 | 4.0 | 4.1 | 4.2 |
| Acceleration performance (five-point method) | 3.0 | 2.8 | 3.0 | 2.7 | 2.9 | 4.2 | 4.1 | 4.1 |

*Length from apex K1 to position M of center block in circumferential direction of tire/maximum block length BL The test results verified that the tires of the inventive example exhibited high steering stability on the wet road surface.

EXAMPLE B

In order to verify the effects of the second aspect of the present invention, pneumatic tires (front wheel size: 10×4.50) for use with a racing kart were prototyped based on the specifications listed in Table 2. They were tested for various performances. As rear wheels of the racing kart, tires each having a size of 11×6.50-5 were mounted. The test methods are the same as in Example A.

|  | Comparative example B1 | Comparative example B2 | Comparative example B3 | Comparative example B4 | Comparative example B5 | Inventive example B1 | Inventive example B2 |
|---|---|---|---|---|---|---|---|
| <Front tire> | | | | | | | |
| Tread pattern diagram | FIG. 7 | FIG. 1 | FIG. 1 | FIG. 1 | FIG. 1 | FIG. 1 | FIG. 1 |
| Land ratio of center portion (%) | 59 | 35 | 60 | 46 | 46 | 47 | 48 |
| Land ratio of shoulder portion (%) | 70 | 66 | 66 | 75 | 52 | 63 | 68 |
| High land ratio region length ZaL/PL (%) | 16 | 29 | 29 | 36 | 19 | 25 | 31 |
| Low land ratio region length ZbL/PL (%) | — | 14 | 5 | 22 | 10 | 14 | 14 |
| <Rear tire> | | | | | | | |
| Tread pattern diagram | FIG. 8 | FIG. 6 | FIG. 6 | FIG. 6 | FIG. 6 | FIG. 6 | FIG. 6 |
| Land ratio of center portion (%) | 40 | 35 | 60 | 45 | 45 | 47 | 49 |
| Land ratio of shoulder portion (%) | 64 | 64 | 64 | 52 | 75 | 64 | 66 |
| High land ratio region length ZaL/PL (%) | 0 | 22 | 22 | 22 | 22 | 21 | 22 |
| Low 1 and ratio region length ZbL/PL (%) | 0 | 0 | 0 | 0 | 0 | 0 | 0 |
| <Test results> | | | | | | | |
| Lap time (sec) | 42.1 | 42.5 | 42.5 | 43 | 42.8 | 41.5 | 41.4 |
| Steering responsiveness (five-point method) | 3.0 | 2.5 | 2.7 | 2.6 | 2.7 | 4.2 | 4.2 |
| Lateral grip performance (five-point method) | 3.0 | 2.5 | 2.6 | 2.3 | 2.7 | 4.0 | 4.2 |
| Acceleration performance (five-point method) | 3.0 | 2.5 | 2.6 | 2.3 | 2.4 | 4.2 | 4.1 |

The test results verified that the tires of the inventive example exhibited high steering stability on the wet road surface.

EXAMPLE C

In order to verify the effects of the third aspect of the present invention, pneumatic tires (front wheel size: 10×4.50) for use with a racing kart were prototyped based on the specifications listed in Table 3. They were tested for various performances. As rear wheels of the racing kart, tires each having a size of 11×6.50-5 were mounted. The test methods are the same as in Example A.

|  | Comparative example C1 | Comparative example C2 | Comparative example C3 | Inventive example C1 | Inventive example C2 | Inventive example C3 |
|---|---|---|---|---|---|---|
| <Front tire> | | | | | | |
| Tread pattern view | FIG. 7 | FIG. 1 | FIG. 1 | FIG. 1 | FIG. 1 | FIG. 1 |
| Width of narrowed width portion Wa (mm) | — | 1.5 | 7.0 | 5.0 | 4.5 | 5.5 |
| Maximum groove width of increased width portion Wb (mm) | — | 16.5 | 22.0 | 20.0 | 19.5 | 20.5 |
| Internal angle γ of tapered portion (degree) | — | 140 | 140 | 140 | 140 | 140 |
| Ratio (BL/BW) | 1.5 | 1.00 | 0.78 | 1.15 | 1.15 | 1.15 |
| <Rear tire> | | | | | | |
| Tread pattern view | FIG. 8 | FIG. 6 | FIG. 6 | FIG. 6 | FIG. 6 | FIG. 6 |
| Width of narrowed width portion Wa(mm) | — | 2.0 | 6.5 | 3.5 | 3.0 | 4.0 |
| Maximum groove width of increased width portion Wb(mm) | — | 13.5 | 18.0 | 15.0 | 14.5 | 15.5 |
| Internal angle γ of tapered portion (degree) | — | 168 | 168 | 168 | 168 | 168 |
| Ratio (BL/BW) | — | 1.8 | 1.4 | 1.9 | 1.9 | 1.9 |

-continued

|  | Comparative example C1 | Comparative example C2 | Comparative example C3 | Inventive example C1 | Inventive example C2 | Inventive example C3 |
|---|---|---|---|---|---|---|
| <Test results> | | | | | | |
| Lap time (sec) | 42.1 | 41.9 | 42.7 | 41.5 | 41.3 | 41.6 |
| Steering responsiveness (five-point method) | 3.0 | 4.3 | 2.5 | 4.2 | 4.3 | 4.1 |
| Lateral grip performance (five-point method) | 3.0 | 2.8 | 2.5 | 4.0 | 4.1 | 4.1 |
| Acceleration performance (five-point method) | 3.0 | 2.8 | 2.5 | 4.2 | 4.2 | 4.1 |

The test results verified that the tires of the inventive example exhibited high steering stability on the wet road surface.

The invention claimed is:

1. A pneumatic tire, comprising:
a tread portion having a tread pattern being formed by repetitive arrangement of substantially identically patterned pattern pitches in the circumferential direction of the tire, wherein
the tread portion has a center portion making up 50% of a tread ground-contact width whose center is a tire equator, and shoulder portions respectively situated on opposite sides of the center portion,
in each of the shoulder portions, shoulder main grooves extending inwardly from an outside relative to a tread ground-contact edge in the axial direction of the tire are arranged at certain intervals in the circumferential direction of the tire, whereby a shoulder land portion is established between the shoulder main grooves, a land ratio in each of the shoulder portion between the tread ground-contact edge and an outer edge of the center portion being 57 to 72%,
in the center portion, between the shoulder land portions being arranged on opposite sides in the axial direction of the tire, at least one center block row having center blocks arranged in the circumferential direction at certain intervals is provided, a land ratio of the center portion being 40 to 55%,
the center block row is formed one in number,
each of the center blocks has its width gradually reduced from a position establishing a maximum width BW in the axial direction of the tire toward both a leading end and a trailing end relative to the tire rotating direction, each of the center blocks being provided, at the leading end thereof, with a tip portion that sharpens toward the leading end, and being provided, at the trailing end thereof, with a concave portion that smoothly concaves toward the leading end, so as to be substantially heart-shaped in its entirety,
in each of the center blocks, a ratio (BL/BW) between the axial maximum width BW and a maximum length BL in the circumferential direction is 1.00 to 1.20,
the tip portion of each of the center blocks has an interior angle $\alpha$ of 100 to 130 degrees,
the concave portion of each of the center blocks has a most concave point positioned on a most leading end in terms of the tire rotation direction, and endmost points being positioned on a most trailing end in terms of the tire rotation direction and being positioned respectively on the opposite sides in the axial direction of the tire,
an angle $\beta$ being formed between lines that are drawn from the most concave point to the endmost points on the opposite sides, respectively, is smaller than the interior angle $\alpha$ of the tip portion, and
a rear end width BWb being a distance in the axial direction of the tire between the endmost points of each of the center blocks is 50 to 67% of the maximum width BW.

2. The pneumatic tire according to claim 1, wherein a difference ($\alpha-\beta$) between the angle $\beta$ and the interior angle $\alpha$ is 10 to 25 degrees.

* * * * *